Oct. 14, 1969 A. H. ASHLEY 3,473,149

MEMORY DRIVE CIRCUITRY

Filed May 2, 1966 2 Sheets-Sheet 1

INVENTOR.
ALBERT H. ASHLEY

BY Stanley M. Schwartz

ATTORNEY

MEMORY DRIVE CIRCUITRY

Filed May 2, 1966 2 Sheets-Sheet 2

INVENTOR.
ALBERT H. ASHLEY
BY Stanley M. Schurgin
ATTORNEY

United States Patent Office 3,473,149
Patented Oct. 14, 1969

3,473,149
MEMORY DRIVE CIRCUITRY
Albert H. Ashley, Holliston, Mass., assignor to Sylvania Electric Products Inc., a corporation of Delaware
Filed May 2, 1966, Ser. No. 546,987
Int. Cl. H04q *1/18*
U.S. Cl. 340—147 10 Claims

ABSTRACT OF THE DISCLOSURE

Coincident current memory system in which memory devices are arranged in rows and columns linked by first and second pluralities of coordinate conductors. Energizing signals are provided to the conductors through switching circuits, each of which includes a pair of transistors of opposite conductivity types connected with the first transistor in the common base configuration and the second in the common emitter configuration. Drive circuits each include a pair of transistors of opposite conductivity types.

This invention relates generally to coincident current memory systems, and more particularly to improved drive circuitry for use in such systems.

In coincident current memory systems, for example, of the type illustrated in U.S. Patent No. 3,058,096, electrical signals are simultaneously applied to the X and Y coordinate conductors associated with a selected memory address to write data into or read data from that address. The particular X and Y conductors are chosen through the operation of the memory driving circuitry. For example, all X conductors are connected in a matrix configuration between a number of drive circuits and switch circuits and a particular X conductor is selected by activating the drive circuit and the switch circuit associated with the conductor. A similar arrangement is employed for the Y conductors. By using this type of a matrix configuration, the number of drive and switch circuits required for memory selection is minimized.

In the above-described memory system, while many drive and switch circuits are necessary to provide the requisite addressing capability, only those drive circuits and switch circuits controlling the selected coordinate conductors are "on" at any given time, these being the circuits corresponding to the selected memory address. All other drive and switch circuits are "off" in that they do not supply data signals to the memory. However, these "off" circuits must be suitably biased to minimize the time required to switch to an "on" condition to effect a sufficiently fast memory cycle time, and this standby power required to bias the "off" circuits may be substantial. One method for minimizing the required standby power has been to use transformer coupling in the drive and switch circuits as described and shown in FIG. 13 of the R.C.A. Application Note SMA–9 of August 1962 by R. T. Lurvey and D. F. Joseph. While this configuration has produced a substantial reduction in the required standby power, it is not readily susceptible to miniaturization, such as in integrated circuitry, since each drive and switch circuit requires a transformer and a capacitor. Other drive and switch circuits have been developed to reduce the required standby power which employ hybrid circuits in which the input stage operates in a common emitter configuration, but to date such circuits have had excessive turn-off times, thereby limiting the memory cycle time, and thus the operating speed, of the data processing equipment. In addition, an output signal from such hybrid circuits suffers a phase reversal and is not compatible with the NPN logic of widely used low level microcircuits. Additional interfacing circuitry is, therefore, required to provide the proper signal polarity.

Accordingly, it is an object of this invention to provide drive circuitry requiring a minimum of standby power, having high-speed operating characteristics and being directly compatible with existing high-speed integrated logic circuits.

Briefly the invention provides hybrid PNP–NPN drive and switch circuits wherein the PNP input stage is operated in the common base configuration and is prevented from going into saturation when turned on, thereby increasing the turn-off speed of the circuit. A single turn-off circuit requiring no standby power can be connected to all drive circuits, which rapidly bring the NPN stage of an "on" drive circuit out of saturation, further improving the turn-off time of the circuit. Since the PNP input stage is operated in the common base configuration, which provides relatively higher drive current and no phase reversal between input and output, it may be connected directly to low-level NPN microcircuits without additional interfacing.

The foregoing and other objects, features and advantages of the invention and a better understanding of its construction and operation will become apparent from the following detailed description, taken in conjunction with the accompanying drawings, in which.

Figure 1:
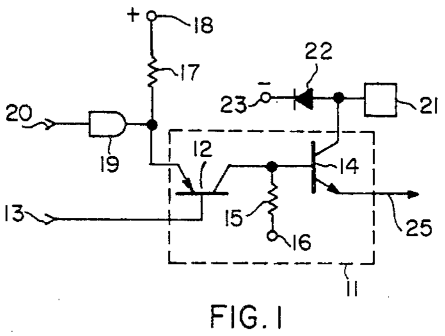
FIG. 1 is a schematic circuit diagram of a switch circuit according to the invention.

Referring to FIG. 1, the switch circuit 11 consists of an input transistor 12 having its base electrode connected directly to input terminal 13 and its collector electrode connected to the base electrode of a second transistor 14 and also connected via resistor 15 to a source of negative potential as represented by terminal 16. A resistor 17 is connected between the emitter of the transistor 12 and a source of positive potential as represented by terminal 18, and an enabling gate 19 is connected between a second input terminal 20 and the emitter of transistor 12. The collector electrode of transistor 14 is connected directly to a current source 21 and is connected via a diode 22 to a source of negative potential as represented by terminal 23. The emitter electrode of the transistor 14 will be connected via line 25 directly to the load being driven.

The operation of the switch circuit of FIG. 1 requires coincident signals to appear at input terminals 13 and 20. Initially assume that the base electrode of transistor 12 is high and no pulse is applied to input terminal 20. Under these conditions both transistors 12 and 14 are cut off so that no current is supplied to the load. To initiate operation, a ground pulse is applied to input terminal 13 and a positive pulse is applied to input terminal 20 thereby activating the enabling gate 19. Transistor 12, being operated in the grounded base configuration, thereby provides ample base current drive to the transistor 14. The drive current source is clamped to the negative voltage source 23 via diode 22, rather than being clamped to ground, thereby keeping the transistor 12 out of saturation, and permitting more rapid turn-off of transistor 12. At the end of the positive pulse applied to input terminal 20, the base emitter junction of the transistor 12 is again reverse-biased, cutting off transistor 12 and removing the base current drive from the output transistor 14.

Figure 2:
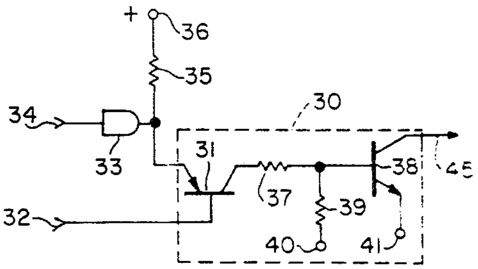
FIG. 2 is a schematic circuit diagram of a drive circuit according to the invention.

Referring next to FIG. 2, the drive circuit 30 is shown and is similar in construction to the switch circuit of FIG. 1. The base electrode of the input transistor 31 is connected directly to an input terminal 32 and an enabling gate 33 is connected between a second input terminal 34 and the emitter of transistor 31. A resistor 35 is connected between the emitter of transistor 31 and a source of positive potential as represented by terminal 36. A resistor 37 is connected between the collector electrode to transistor 31 and the base electrode of transistor 38, with the latter also connected bia a resistor 39 to a source of negative potential as represented by terminal 40. The emitter electrode of transistor 38 is connected directly to a source of negative potential as represented by terminal 41 and its collector electrode is connected via line 45 to the load being driven.

The operation of the drive circuit of FIG. 2 is similar to that of the switch circuit of FIG. 1. Coincident pulses applied to input terminals 32 and 34 render transistor 31 conducting in a grounded base configuration thereby providing ample base current drive to the output transistor 38, thereby rendering it conducting to provide the necessary current to the load being driven. When the input pulse or pulses are removed from terminals 32 and 34, transistor 31 is rendered non-conducting thereby removing the source of base current drive to the transistor 38. If the inherent turn-off speed of the circuit is too long, it may be shortened by connecting the base electrode of the transistor 38 to a turn-off circuit operative to rapidly remove the charge from the base of the transistor 38.

Figure 3:
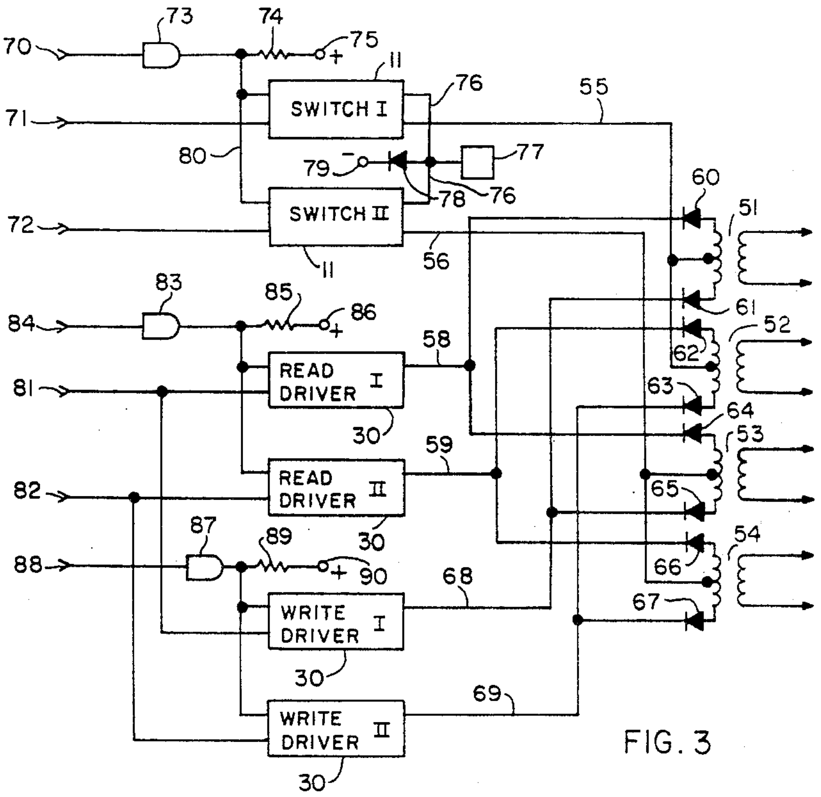
FIG. 3 is a schematic block diagram of a bipolar transformer driving network according to the invention.

Referring next to FIG. 3, there is shown a bipolar transformer network utilizing the switch circuit 11 and the drive circuit 30 of respective FIGS. 1 and 2. For simplicity and ease of illustration, only a four transformer network is shown, although it is readily apparent that the concept may be extended to a network containing any number of transformers.

The network consists of two switch circuits 11, two read driver circuits 30, two write driver circuits 30 and four transformers 51, 52, 53 and 54 having center-taps on the primary windings. The output 55 of switch circuit I is connected directly to the center taps on the primary windings of the transformers 51 and 52, and in similar fashion, the output 56 of switch circuit II is connected directly to the center-taps of the primary windings of the transformers 53 and 54. The output 58 of the read drive I is connected via diodes 60 and 64, respectively, to the top terminals of the primary windings of transformers 51 and 53, and similarly the top terminals of the primary windings of the transformers 52 and 54 are connected via diodes 62 and 66 respectively, to the output 59 of the read driver II. In like manner the outputs 68 and 69 of the write drive I and write drive II are connected to the bottom terminals of the primary windings of the transformers 51, 53 and 52, 54, respectively, via diodes 61, 65 and 63, 67.

In the switch circuitry, the collector outputs 76 of switch circuits I and II are connected to a current source 77, and via a diode 78 to a source of negative potential as represented by the terminal 79. The inputs 80 to the emitter electrodes of the switch circuits 11 are connected via an enable gate 73 to an input terminal 70 and via a resistor 74 to a source of positive potential as represented by the terminal 75. Input terminals 71 and 72 are connected directly to the base input leads of the switch I and switch II circuits, respectively.

In the driver portion of the network, a first terminal 81 is connected to the base input leads of the read driver I and the write driver I, with a second terminal 82 connected to the base input leads of the read driver II and the write driver II. The emitter input leads of the read drivers I and II are connected via an enable gate 83 to an input terminal 84, and via a resistor 85 to a source of positive potential as represented by the terminal 86. In like fashion, the emitter input leads of the write drivers I and II are connected to an input terminal 88 via an enable gate 87, and are connected via a resistor 89 to a source of positive potential as represented by terminal 90.

The network of FIG. 3 might be used, for example, to provide read/write signals to the coordinate conductors of a coincident current memory, that is, the secondary windings of the transformers 51, 52, 53 and 54 would be connected directly to a set (X, Y or Z) of the coordinate conductors of the memory. Similar networks would then provide the read/write signals for the remaining sets of coordinate conductors.

To illustrate the operation of the network of FIG. 3, the following description is given of the manner in which pulses are generated and provided at the secondary winding of the transformer 52. First, suitable pulses are applied to input terminals 71 and 82. The pulses may be regarded as addressing pulses and serve to provide the proper bias of the inputs of the switch I circuit and the read driver II and write driver II circuits, but are not sufficient to render these circuits conducting. Concurrently, a pulse is applied to input terminal 70, and a pulse is applied to either input terminal 84 if a read operation is required, or to input terminal 88 if a write operation is required. Assuming that the read operation is required, when the concurrent pulses are applied to input terminals 70, 71, 84 and 82, switch circuit I and read driver II are rendered conducting so that current flows from the output 55 of the switch I circuit to the center tap of the primary winding of the transformer 52 through the upper half of this primary winding and diode 62 to the output 59 of the read driver II, thereby inducing a read current pulse into the secondary winding of the transformer 52 as desired. Conversely, if the write driver II, rather than the read driver II, had been activated, the current would have passed from the center tap through the bottom part of the primary winding of the transformer 52 and diode 63 to the output 69 of the write driver II, thereby inducing a write current pulse (of opposite polarity) into the secondary winding of the transformer 52. In like manner, a read or write pulse could be derived from the secondary winding of any transformer by appropriately enabling the switch circuit and the read or write drive uniquely associated with the selected transformer. The turn-off occurs upon the termination of any one of the enabling pulses applied to the input terminals, as previously explained in the description of the operation of the circuits in FIGS. 1 and 2.

Figure 3A:
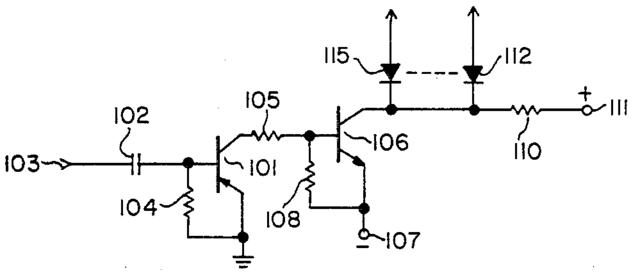
FIG. 3A is a schematic circuit diagram of a rapid turn-off circuit which may be used with the network of FIG. 3.

The rapid turn-off circuit shown schematically in FIG. 3A may be used with the network of FIG. 3 and the driver circuits of FIG. 2 to improve the turn-off characteristic of the network. The circuit consists of an input transistor 101 having its emitter electrode connected to a point of ground potential and its base electrode connected via a capacitor 102 to an input terminal 103. A resistor 104 is connected between the base and emitter electrodes of the transistor 101 with its collector electrode connected via a resistor 105 to the base electrode of a transistor 106. A source of negative potential as represented by the terminal 107 is connected directly to the emitter electrode and via a resistor 108 to the base electrode of the transistor 106. The collector electrode of the transistor 106 is connected via a resistor 110 to a source of positive potential as represented by the terminal 111 and is connected by diodes 112, . . . , 115 to the base electrode of the output transistor in each of the driver circuits.

The operation of the turn-off circuit of FIG. 3A is initiated by the application of a positive pulse to the input terminal 103, this positive pulse being coincident with the read or write command pulse applied to the selected enable gate and of the same pulse width. This positive pulse is differentiated by the capacitor 102 thereby producing a positive voltage spike corresponding to the leading edge of the pulse and a negative voltage spike corresponding to the trailing edge of the pulse. The negative voltage spike turns on the transistor 101 which then turns on the transistor 106. With transistor 106 on, the charge is quickly removed from the base of the "on" driver output transistor, thereby effecting a more rapid turn-off at the end of a read or write operation. This turn-off circuit, requiring no standby power, takes advantage of the fact that only one driver circuit is on at any time, so one turn-off circuit is capable of controlling a large number of driver circuits and further does not require any specific addressing.

Figure 4:
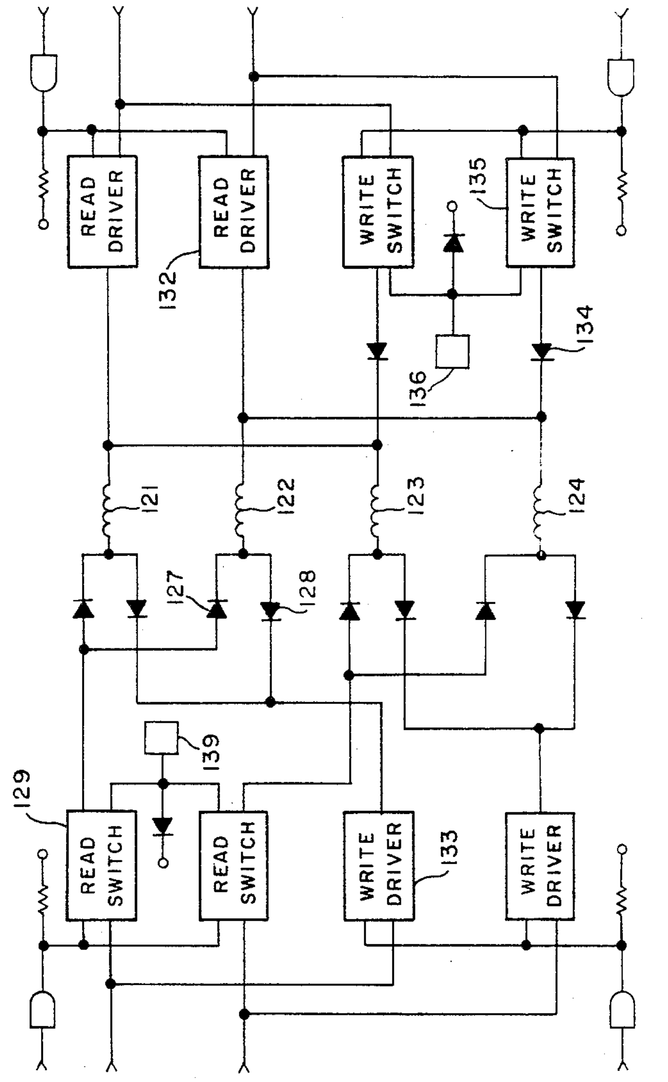
FIG. 4 is a schematic block diagram of a direct drive memory system according to the invention.

The schematic block diagram in FIG. 4 illustrates an alternate embodiment of a drive system according to the invention. In this embodiment separate read and write switch circuitry is required with the drive lines 121 to 124 being connected in a matrix configuration between the read and write drive and switch circuits. These lines 121 to 124 can, for example, be one set of the coordinate conductors (i.e. X-axis) of a memory plane, in which case the illustrated network is described as a direct drive memory configuration. As shown, one end of each line is connected to a read driver circuit and a write switch circuit with the other end of the line connected to a read switch circuit and a write driver circuit. For example, one end of the line 122 is connected directly to read driver circuit 130 and via diode 134 to write switch 135, with the other end of the line 122 connected via diodes 127 and 128 to the read switch 129 and the write driver 133, respectively. This configuration also differs from that of FIG. 3 in that separate read current source 139 and write source 136 are required for the read and write switch circuits, respectively. In all other respects the construction and operation of the networks of FIG. 3 and FIG. 4 are the same.

What is claimed is:

1. A semiconductor switching circuit comprising:
   - an input stage including a first transistor of one conductivity type connected in a common base configuration,
   - an output stage connected to the input stage and including a second transistor of the opposite conductivity type connected in a common emitter configuration, and
   - a source of electrical potential connected to said output stage and operative to prevent said input stage from saturating.

2. A semiconductor switching circuit according to claim 1 wherein:
   - the collector electrode of the first transistor is connected to the base electrode of the second transistor, and
   - said source of electrical potential comprises:
     - a current source connected to the collector electrode of said second transistor, and
     - a source of bias potential connected via a diode to the collector electrode of said second transistor.

3. For a coincident current memory system in which memory devices are arranged in rows and columns and linked by first and second pluralities of coordinate conductors, circuitry for providing energizing signals to the coordinate conductor of a selected row or column of said memory devices, comprising:
   - first and second hybrid semiconductor circuits each having an input stage connected in a common base configuration and an output stage connected in a common emitter configuration;
   - a source of energizing potential connected to the output stage of said first hybrid semiconductor circuit operative to prevent the input stage of said circuit from saturating; and
   - means connecting the opposite ends of said selected coordinate conductor to the respective outputs of said first and second hybrid circuits.

4. The invention according to claim 3, wherein the input stage of said first hybrid circuit comprises a first transistor having base, emitter and collector electrodes; the output stage of said first hybrid circuit comprises a second transistor having base, emitter and collector electrodes including means connecting the base electrode of said second transistor to the collector electrode of said first transistor, and wherein said source of energizing potential connected to the output stage of said first hybrid circuit comprises a current source connected to the collector electrode of said second transistor and a source of bias potential connected via a diode to the collector electrode of said second transistor.

5. The invention according to claim 4, wherein the input stage of said second hybrid circuit comprises a third transistor having base, emitter and collector electrodes; the output stage of said second hybrid circuit comprises a fourth transistor having base, emitter and collector electrodes including means connecting the base electrode of said fourth transistor to the collector electrode of said third transistor; and wherein said means connecting the opposite ends of said selected coordinate conductor to the outputs of said first and second hybrid circuits includes means connecting one end of said coordinate conductor to the emitter electrode of said second transistor and means connecting the other end of said coordinate conductor to the collector electrode of said fourth transistor.

6. For a coincident current memory system in which memory devices are arranged in rows and columns and are linked respectively by first and second pluralities of coordinate conductors, each conductor having first and second end terminals, for each of said pluralities of conductors a network for providing energizing signals to the conductors, said network comprising:
   - a plurality of switch circuits, each comprising first and second transistors having base, emitter and collector electrodes; means connecting the collector electrode of said first transistor to the base electrode of said second transistor; and an output terminal connected to the emitter electrode of said second transistor;
   - means for providing current drive to the collector electrode of the second transistor in each of said switch circuits;
   - a plurality of drive circuits, each comprising first and second transistors having base, emitter and collector electrodes; means connecting the collector electrode of said first transistor to the base electrode of said second transistor; a source of electrical potential connected to the emitter electrode of said second transistor; and an output terminal connected to the collector electrode of said second transistor;
   - means for selectively applying gate signal pulses to the emitter electrode of the first transistor in each of said pluralities of said switch and drive circuits;
   - means for selectively applying control signal pulses to the base electrode of the first transistor in each of said pluralities of said drive and switch circuits; and
   - means connecting said plurality of conductors between the output terminals of said pluralities of switch and drive circuits, whereby signal pulses applied to a selected switch and a selected drive circuit cause a current pulse of the desired polarity to pass through only one of said plurality of conductors.

7. The invention according to claim 6, wherein said plurality of switch circuits comprises one or more groups of switch circuits and wherein for each group of switch circuits, said means for providing current drive to the collector electrode of the second transistor in each of said switch circuits comprises:
   - a current source;
   - a source of bias potential;
   - a diode connected between said current source and said source of bias potential; and
   - means connecting the collector electrode of the second transistor in each switch circuit to said current source.

8. The invention according to claim 6, wherein said plurality of drive circuits comprises a group of read drive circuits and a group of write drive circuits and wherein said means connecting said plurality of conductors between the output terminals of said pluralities of switch and drive circuits comprises:

a plurality of pulse transformers each having a center tapped primary winding and a secondary winding;

means connecting the first and second end terminals of each of said conductors across the secondary winding of one of said plurality of pulse transformers;

means connecting the center-tap of the primary winding of each of said plurality of pulse transformers to an output terminal of one of said plurality of switch circuits;

means connecting one end of the primary winding of each said plurality of pulse transformers to an output terminal of one of said group of read drive circuits; and means connecting the other end of the primary winding of each of said plurality of pulse transformers to an output terminal of one of said group of write circuits.

9. The invention according to claim 6, wherein said plurality of switch circuits comprises a group of read switch circuits and a group of write switch circuits, said plurality of drive circuits comprises a group of read drive circuits and a group of write drive circuits, and said means connecting said plurality of conductors between the output terminals of said pluralities of switch and drive circuits comprises:

means connecting the first end terminal of each of said plurality of conductors to an output terminal of one of said group of read switch circuits;

means connecting the first end terminal of each of said plurality of conductors to an output terminal of one of said group of write drive circuits;

means connecting the second end terminal of each of said plurality of conductors to an output terminal of one of said group of read drive circuits; and means connecting the second end terminal of each of said plurality of conductors to an output terminal of one of said group of write switch circuits.

10. The invention according to claim 6, additionally including a fast turn-off circuit, which comprises:

first and second transistors having base, emitter and collector electrodes;

an input terminal adapted to receive input signal pulses;

a capacitor connected between the base electrode of said first transistor and said input terminal;

a first resistor connected between the base electrode of said first transistor and a point of reference potential;

means connecting the emitter electrode of said first transistor to said point of reference potential;

means connecting the collector electrode of said first transistor to the base electrode of said second transistor;

a first source of energizing potential connected to the emitter electrode of said second transistor;

a second source of energizing potential;

a second resistor connected between said second source of energizing potential and the collector electrode of said second transistor; and means connecting the collector electrode of the second transistor of said fast turn-off circuit to the base electrode of the second transistor in each of said plurality of drive circuits.

References Cited

UNITED STATES PATENTS

| | | | |
|---|---|---|---|
| 3,054,905 | 9/1962 | Lee | 307—88 |
| 3,235,754 | 2/1966 | Beulow et al. | 307—213 XR |
| 3,289,191 | 11/1966 | Schauer | 40—166 XR |

DONALD YUSKO, Primary Examiner

U.S. Cl. X.R.

307—213